Feb. 17, 1931.  A. J. JANSSON  1,792,842
RUBBER SPRING SHACKLE
Filed March 17, 1927   2 Sheets-Sheet 1
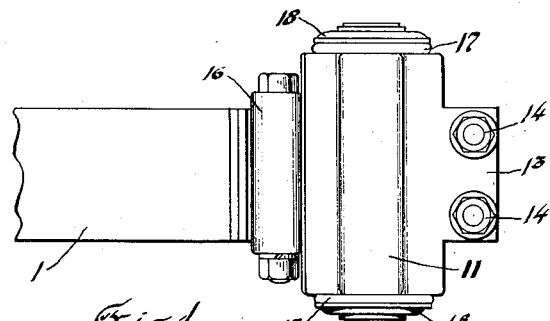
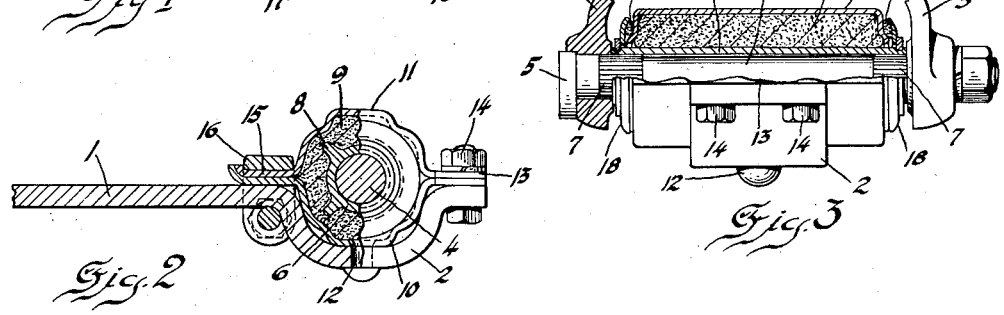
Inventor
Axel J. Jansson Feb. 17, 1931.   A. J. JANSSON   1,792,842
RUBBER SPRING SHACKLE
Filed March 17, 1927   2 Sheets-Sheet 2
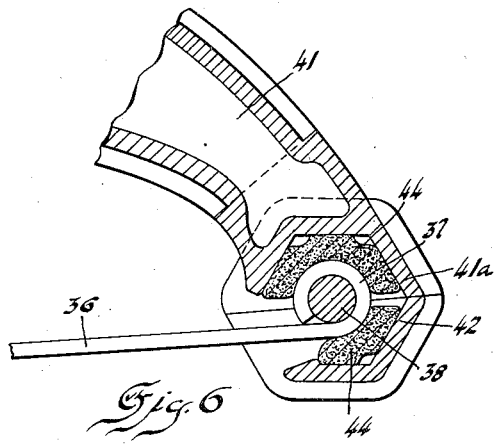
Fig. 6
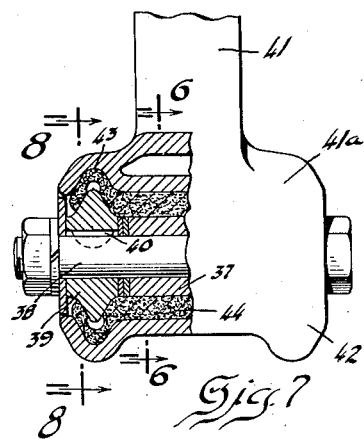
Fig. 7
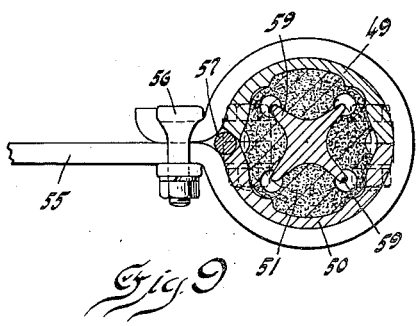
Fig. 9
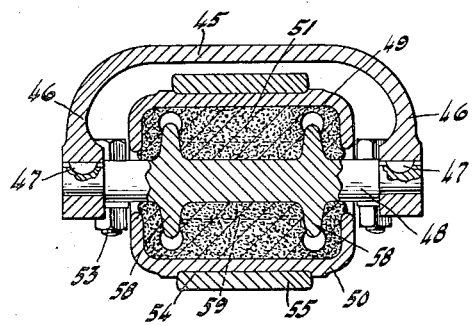
Fig. 10
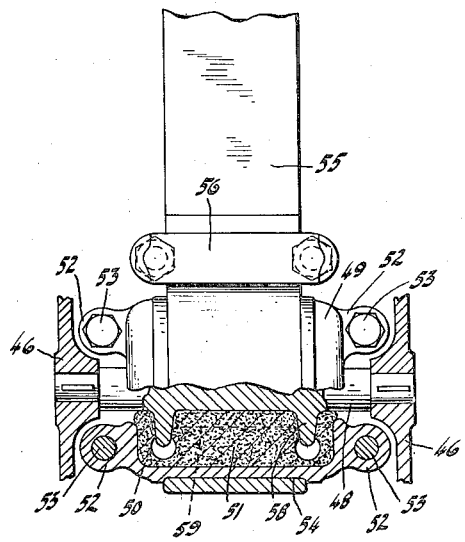
Fig. 11
Fig. 8
Inventor
Axel J. Jansson
By Blackmore, Spencer & Hiuli
Attorneys Patented Feb. 17, 1931

1,792,842

UNITED STATES PATENT OFFICE

AXEL J. JANSSON, OF FLINT, MICHIGAN, ASSIGNOR TO GENERAL MOTORS CORPORATION, OF DETROIT, MICHIGAN, A CORPORATION OF DELAWARE

RUBBER SPRING SHACKLE

Application filed March 17, 1927. Serial No. 176,102.

This invention relates to pivotal connections and has particular application as a joint for the ends of vehicle springs, wherein relative movement is generally of more or less frequent occurrence, but of comparatively small range.

The object of the invention is to provide a simple and inexpensive joint embodying an elastic material interposed between and keyed or interlocked with the respective parts to be joined for distortion or deformation to accommodate relative movement of the parts, whereby frictional metallic contact and resultant wear are eliminated, providing a joint which will require little or no attention, obviate the usual problems of lubrication, and which in operation will noiselessly cushion vibrations, road shocks and the like.

A further object of the invention is to provide a resilient mounting which will readily yield to permit relative pivotal or rotational movement, but which will be resistant to axial movement and side sway of the parts.

Other objects and advantages will be apparent from the following specification, when taken in connection with the accompanying drawing, illustrating the embodiment of the invention in several forms, and wherein Figs. 1, 2 and 3 are respectively a top plan view, a side elevation and an end elevation, the latter two views being partly in section, illustrating the invention embodied in a hinge joint or pivotal connection for the driving or front end of a vehicle spring; Fig. 4 is a vertical sectional view and Fig. 5 is an end elevation partly in section, showing the invention applied to a swinging shackle type of connection for the rear end of the spring; Figs. 6, 7 and 8 illustrate a modified form of hinge joint, Fig. 7 being an end elevation partly in section and Figs. 6 and 8 respectively being vertical sections on lines 6—6 and 8—8 of Fig. 7; Fig. 9 is a vertical section of a further modification, embodied in a pivot joint at the front end of a spring; Fig. 10 is a transverse section thereof, and Fig. 11 is a top plan view partly in section of the modification shown in Fig. 9.

Referring to the drawings in Figs. 1, 2 and 3, the reference character 1 indicates the main leaf of a semi-elliptical multiple leaf vehicle spring, having a channel 2 at the end thereof, and 3 represents a pair of spaced dependent arms forming a part of a hanger bracket to be carried by the vehicle frame. A pivot pin or bolt 4 passes through openings in the ends of the arms 3, and is securely held against rotation by any suitable means, as for instance, by seating the enlarged head 5 on the end of the bolt, within a notch or groove in the adjacent face of the arm. A stationary sleeve 6 carried on the bolt 4, which bolt may be serrated as at 7 to insure a tight fit, has projecting outwardly or radially from the periphery of the sleeve, a number of ears or webs 8 extending transversely of the sleeve. An annular body 9 of rubber or other elastic material surrounds the sleeve 6 and is enclosed within a housing or casing formed by a pair of oppositely disposed separable cup shaped members 10 and 11, stamped from sheet metal. The lower cup member 10 is permanently riveted as at 12 in the channel 2 of the spring, and both members are provided with apertured ears 13 at one side secured by fastening bolts 14 to the spring leaf, and at the other side, with lateral extensions 15 held by a U-shaped clamp 16. The inner surfaces of the two cups are such as to interlock with the adjacent surfaces of the elastic body 9 and hold it against bodily rotation within the housing. The webs 8 projecting outwardly into the elastic body 9, are thus also locked or keyed therewith, and upon spring deflection, the elastic body will yield or be deformed between the walls of the housing and stationary pin, to give a pivotal action to the end of the spring. To prevent side-sway or axial movement of the end of the spring with the pivot pin, annular elastic rings 17 of rubber or the like, are held by retainer disks 18 carried by the sleeve, against the opposite side walls of the cup shaped housing members 10 and 11, as is shown in Fig. 3.

The swinging shackle of Figs. 4 and 5 is quite similar in principle to the pivotal connection heretofore described, except that a pair of pivot pins extend through opposite ends of an elongated rubber block, and are respectively secured to the chassis frame and spring end. In this case, the elongated block 19 of rubber or similar elastic material, is enclosed within a pair of channel shaped housing members 20 and 21, the edges of which are bent upon each other to form the seams 22 and the open ends are closed by flanged caps or covers 23. Stationary pins or bolts 24 extend through the upper and lower portions of the block 19, the upper pin being carried by the dependent forks or arms 25 of the hanger bracket 26, riveted or otherwise secured to one of the members 27 of the chassis frame, while the lower pin is carried in the arms 28 of a bracket 29, riveted at 30 to the end of the spring leaf 31. Each pin 24 has thereon a fixed sleeve 32, provided with outwardly projecting webs 33 extending into the rubber block to deform the material thereof upon swinging movement, and each sleeve is likewise provided with retainer discs 34, for elastic rings 35, abutting the closure caps 23, to resist axial movement.

Figs. 6, 7 and 8 illustrate a modified form of pivotal connection wherein the end of the spring leaf 36 has a coiled eye 37, through which passes a pin or bolt 38 carrying at either side, a hexagonal collar 39, keyed as at 40 to the pin 38, the periphery of which is V-shaped to present outwardly projecting tapered walls. The eye 37 and the collars 39 associated therewith, are located within a hexagonal shaped housing at the end of a downturned horn 41, at the front end of one of the chassis frame members, the housing being formed in two halves 41a and 42, the lower half being detachably secured to the horn. Annular V-shaped channels 43 are provided on the inside of the hexagonal housing, into which extend the tapering side walls of the hexagonal collars 39. Elastic rubber blocks 44 are interposed between the housing and the eye 37 and collars 39, which are deformable upon relative movement of the parts, while the tapering side walls of the channels 43 and collars 39, hold the joint against side sway.

In the remaining figures of the drawing, the reference character 45 represents a hanger bracket adapted for attachment to the chassis frame, in the forked arms 46 of which is keyed as at 47, a pivot pin 48, extending axially through a two part housing 49—50 surrounding the intermediate elastic bushing 51. The parts 49 and 50 are provided with lateral attachment ears 52, secured to each other by fastening bolts 53, and about the outside of the housing is an annular groove 54. The end of the spring leaf 55 is coiled about the housing, being seated within the annular groove 54, and is secured to the adjacent portion of the spring leaf by a U-clamp 56. A pin or key 57 is inserted between the coil of the spring leaf and the housing to prevent relative rotation thereof. The inside surface of the housing is of irregular or uneven contour so as to interlock with the adjacent surface of the rubber block, and the stationary pin 48 has a pair of spaced integrally formed annular flanges 58, with transverse webs 59 extending therebetween, the flanges and webs projecting into the rubber bushing, whereby the bushing due to its elasticity, is distorted upon the relative movement of the parts. The end walls of the housing and annular flanges 58, are insulated from each other by a comparatively thin portion of the elastic material, and co-operate to hold the parts against relative side sway or axial movement, while the material between the transverse webs or projections 59 and inner periphery of the housing, through its deformation, compensates for relative pivotal movement.

While the invention has been described more or less specifically, it is to be understood that it is not limited to exact details shown, but that it is capable of such various modifications as come within the scope of the appended claims.

Having described my invention, I claim:

1. A pivotal joint including in combination, a hanger bracket having a pair of dependent spaced fingers, a pivot pin carried by said fingers in fixed relation therewith, and having outwardly extending peripheral projections associated therewith, a member to be pivotally connected with said pin, a body of deformable elastic material interposed between said member and pin and having interlocking engagement with said peripheral projections and completely enclosed within said member, and other bodies of elastic material carried by said pin and engageable with the opposite sides of said member to resist relative axial movement thereof.

2. A pivot joint including in combination with two members to be pivotally connected, a housing associated with one of the members, a pivot pin associated with the other of said members and extending axially through said housing in spaced relation with the walls thereof, a body of elastic deformable material completely enclosed within the housing and filling the space between said housing and pin and having keyed interlocking engagement with adjacent surfaces thereof, whereby said material is deformed upon relative rotation of said members, retainer members carried by said pin on opposite sides of the housing and elastic material interposed between said retainers and sides of the housing to resist relative axial movement between said members.

3. A pivotal joint including in combination with two members to be pivotally interconnected, a housing associated with one of the members, a pivot pin associated with the other of said members and extending through said housing in spaced relation with the walls thereof, peripheral projections extending outwardly from said pin, a body of elastic deformable material completely enclosed within said housing and filling the space between said pin and housing for deformation between the walls of said housing and said projections upon relative movement of said parts, retainer members carried by the pin at the sides of the housing and elastic material within said retainers for engagement with the housing to resist axial movement thereof.

4. In a swinging shackle connection, the combination with a vehicle frame and a supporting spring therefor, of a bracket secured to the frame and having a pair of spaced ears, a pivot pin fixedly carried by and extending between said ears, a bracket secured on the end of the spring and having a pair of spaced ears, a pivot pin fixedly carried by and extending between said second mentioned pair of ears, both of said pins being provided with outwardly extending projections, and a swinging link connecting said pins and including a block of non-metallic elastic deformable material surrounding both of said pins and into which said projections extend, and a housing for confining said block and limiting the extent of deformation thereof.

5. In a swinging shackle connection, the combination with a vehicle frame, and a supporting spring therefor, of a pair of pivot pins fixedly associated respectively with the frame and spring, and provided with peripheral projections, and a connecting link of elastic deformable material thru which said pins extend.

6. In a swinging shackle connection, the combination with a vehicle frame, and a supporting spring therefor, of a pair of pivot pins fixedly associated respectively with the frame and spring, and provided with peripheral projections, and a connecting link of elastic deformable material thru which said pins extend, and a casing surrounding said elastic link and confining the deformation thereof.

7. In a swinging shackle connection, the combination with a vehicle frame and a supporting spring therefor, of a pair of pivot pins fixedly associated respectively with the frame and spring, a connecting link of elastic material thru which said pins project, and which is adapted for deformation to permit relative movement of the pins, a casing for the elastic material confining deformation thereof, and resilient means carried by the pins for engagement with sides of the casing to resist movement thereof axially of the pins.

8. A pivot joint for connecting two members, including a pin carried by one of the members having peripheral projections thereon, a sleeve of non-metallic elastic material surrounding said pin, and a housing for said elastic sleeve carried by the other of said members and comprising two portions adapted to be clamped together and which are of uneven contour, and means to clamp said housing portions together to hold the sleeve under an initial degree of pressure.

9. A pivotal joint including in combination, a pin having peripheral projections thereon, a sleeve of non-metallic elastic material surrounding said pin, a housing enclosing said elastic sleeve, said housing comprising separable parts adapted to be clamped together and which are of uneven contour, and means to clamp said parts together to hold the sleeve to an initial degree of pressure between said housing and pin.

In testimony whereof I affix my signature.

AXEL J. JANSSON.